United States Patent Office 3,415,877
Patented Dec. 10, 1968

3,415,877
PROCESS FOR PREPARING 2-ETHYL-3-METHYL PENTANOIC ACID
Phillip Adams, Murray Hill, Benedict R. Juliano, Elizabeth, Howard Feilich, Plainfield, and Frank Baron, Elizabeth, N.J., assignors to Millmaster Onyx Corporation, New York, N.Y., a corporation
No Drawing. Filed Oct. 19, 1965, Ser. No. 498,104
1 Claim. (Cl. 260—530)

ABSTRACT OF THE DISCLOSURE 2-ethyl-3-methyl pentanoic acid is prepared by treating 2-ethyl-3-methyl-pentanal, in the form of an aqueous dispersion, non-catalytically with an oxygen-containing gas at a temperature from —20 to 60° C. and a pressure of 0 to 500 p.s.i.

---

This invention relates to new and useful improvements in the preparation of 2-ethyl-3-methyl pentanoic acid. This material finds great utility in preparing pharmaceuticals containing a minimum of undesirable side products.

The preparation of 2-ethyl-3-methyl pentanoic acid by various reported techniques, e.g., malonic ester condensation, etc., results in products containing deleterious side products and is also fairly expensive.

It has now been found that 2-ethyl-3-methyl pentanoic acid can be prepared by treating 2-ethyl-3-methyl pentanal with an oxygen containing gas under controlled conditions. The reaction furthermore is advantageously carried out non-catalytically.

It is particularly surprising that the reaction should proceed rapidly non-catalytically with a minimum of degradation.

The 2-ethyl-3-methyl pentanal reactant can be prepared by treating 2-ethyl-3-methyl-4-pentanal with $H_2$ and a Raney nickel catalyst.

An oxygen containing gas is employed in the process including air, but the reaction proceeds more rapidly with higher oxygen concentrations.

The non-catalytic oxidation results in a minimum of product degradation, but under certain circumstances an oxidation catalyst may be employed as an adjuvant.

The oxidation can be carried out with the organic reactant in the form of an aqueous dispersion in from about 2 to 4 parts of water.

Temperatures of —20 to 60° C., preferably 1 to 60° C., are employed in the oxidation, with the higher temperatures used in the aqueous systems.

Pressures of about 0–500 p.s.i. can be used.

The product is recovered by solution in aqueous caustic, followed by acidification.

This invention, product work-up, and its advantages will be better understood by reference to the following example.

Example 1

32 gms. of 2-ethyl-3-methyl-pentanal were dispersed in 64 ml. of water. The system was stirred for 2.5 hours at 17–20° C. under 30 p.s.i. oxygen pressure. The acid was dissolved by addition of 20 ml. of 50% caustic. The extract was separated and acidified with sulfuric acid. After washing, 29.3 gms. of product (representing a very good yield of 80%) were obtained.

The advantages of this invention will be apparent to the skilled in the art. Among these are: an inexpensive process is provided, and undesirable by-products are avoided.

It is to be understood that this invention is not limited to the specific example which has been offered merely as an illustration, and that modifications can be made without departing from the spirit thereof.

What is claimed is:
1. A process for preparing 2-ethyl-3-methyl pentanoic acid which comprises treating 2-ethyl-3-methyl-pentanal, in the form of an aqueous dispersion in from about 2 to 4 parts of water, non-catalytically, with an oxygen-containing gas at a temperature in the range of —20 to 60° C. and a pressure in the range of to 500 p.s.i. and recovering the desired product.

References Cited

UNITED STATES PATENTS

| | | | |
|---|---|---|---|
| 3,251,876 | 5/1966 | Morlock | 260—491 |
| 2,115,892 | 5/1938 | Toussaint | 260—530 |

FOREIGN PATENTS 824,116   11/1959   Great Britain.

LORRAINE A. WEINBERGER, *Primary Examiner.*

D. STENZEL, *Assistant Examiner.*

UNITED STATES PATENT OFFICE
CERTIFICATE OF CORRECTION

Patent No. 3,415,877                                              December 10, 1968

Phillip Adams et al.

It is certified that error appears in the above identified patent and that said Letters Patent are hereby corrected as shown below:

Column 2, line 32, "to 500" should read -- 0 to 500 --.

Signed and sealed this 10th day of March 1970.

(SEAL)
Attest:

Edward M. Fletcher, Jr.                            WILLIAM E. SCHUYLER, JR.
Attesting Officer                                            Commissioner of Patents